US011506081B2

(12) United States Patent
Kempers (10) Patent No.: US 11,506,081 B2
(45) Date of Patent: Nov. 22, 2022

(54) FILTRATION SYSTEM FOR GEARED TURBOFAN TANK

(71) Applicant: Rolls-Royce Corporation, Indianapolis, IN (US)

(72) Inventor: Adam L. Kempers, Indianapolis, IN (US)

(73) Assignee: ROLLS-ROYCE CORPORATION, Indianapolis, IN (US)

(*) Notice: Subject to any disclaimer, the term of this patent is extended or adjusted under 35 U.S.C. 154(b) by 81 days.

(21) Appl. No.: 16/549,622

(22) Filed: Aug. 23, 2019

(65) Prior Publication Data
US 2021/0054763 A1 Feb. 25, 2021

(51) Int. Cl.
| F01D 25/20 | (2006.01) |
| B01D 29/03 | (2006.01) |
| F01M 11/03 | (2006.01) |
| B01D 21/26 | (2006.01) |
| B01D 35/06 | (2006.01) |

(Continued)

(52) U.S. Cl.
CPC ......... F01D 25/20 (2013.01); B01D 21/0012 (2013.01); B01D 21/267 (2013.01); B01D 29/03 (2013.01); B01D 35/06 (2013.01); B01D 36/045 (2013.01); B03C 1/286 (2013.01);

(Continued)

(58) Field of Classification Search
CPC .......... F01D 25/20; F16N 39/06; F16N 39/00; F16N 2210/02; F16N 7/385; B01D 21/0012; B01D 21/267; B01D 21/24; B01D 21/444; B01D 29/03; B01D 35/06;

(Continued)

(56) References Cited

U.S. PATENT DOCUMENTS

| 1,416,899 A * | 5/1922 | Sirch ...................... B01D 21/10 210/776 |
| 1,756,862 A * | 4/1930 | Holford ............. B01D 17/0208 210/109 |

(Continued)

OTHER PUBLICATIONS

Michaud, David, "Hydrocyclone Working Princiiple," dated Aug. 7, 2015, pp. 1-6, Available at URL: http://911metallurgist.com/blog/hydrocyclone-workingprinciple.

(Continued)

*Primary Examiner* — Liam Royce
(74) *Attorney, Agent, or Firm* — Crowell & Moring LLP (57) ABSTRACT

A filtration system is provided that includes a gearbox positioned in a geared turbofan engine. The system further includes an auxiliary lubrication system positioned in the geared turbofan engine and in fluid communication with the gearbox. The auxiliary lubrication system includes an auxiliary reservoir, an auxiliary pump in fluid communication with the auxiliary reservoir, an auxiliary return line extending between the gearbox and the auxiliary reservoir, the auxiliary return line configured to transport a lubricant from the gearbox to the auxiliary reservoir, and an auxiliary supply line extending between the auxiliary pump and the gearbox, the auxiliary supply line configured to transport the lubricant from the auxiliary pump to the gearbox. The system further includes a non-removable filter positioned in the auxiliary lubrication system. The non-removable filter is configured to prevent or limit debris that is suspended in the lubricant from flowing into the gearbox and/or the auxiliary pump.

6 Claims, 6 Drawing Sheets

(51) Int. Cl.
*B01D 36/04* (2006.01)
*B01D 21/00* (2006.01)
*F16N 39/06* (2006.01)
*B03C 1/28* (2006.01)

(52) U.S. Cl.
CPC ............. *F01M 11/03* (2013.01); *F16N 39/06* (2013.01); *F16N 2210/02* (2013.01)

(58) Field of Classification Search
CPC .... B01D 36/045; B01D 221/14; F01M 11/03; B03C 1/286
See application file for complete search history.

(56) References Cited

U.S. PATENT DOCUMENTS

| | | | | |
|---|---|---|---|---|
| 1,768,550 A | * | 7/1930 | Fekete | B03C 1/30 |
| | | | | 210/223 |
| 2,149,764 A | * | 3/1939 | Frei | B03C 1/0332 |
| | | | | 209/215 |
| 4,529,517 A | * | 7/1985 | Carlvret | B03C 1/286 |
| | | | | 210/223 |
| 5,529,695 A | * | 6/1996 | Gwozdz | B01D 21/0009 |
| | | | | 210/112 |
| 9,849,411 B2 | | 12/2017 | Sheridan | |
| 2003/0114267 A1 | * | 6/2003 | Poulin | F16H 57/082 |
| | | | | 475/331 |
| 2006/0249332 A1 | * | 11/2006 | Bruce | F01D 25/20 |
| | | | | 184/6.11 |
| 2018/0163625 A9 | | 6/2018 | Sheridan | |
| 2019/0195091 A1 | * | 6/2019 | Uhkoetter | F01D 25/20 |

OTHER PUBLICATIONS

Wang, Ziping et al., "Research Progress on Monitoring and Separating Suspension Particles for Lubricating Oil," dated Jun. 5, 2018, pp. 1-9, Hindawi Complexity, vol. 2018, Article ID 9356451 Available at URL: https://doi.org/10.1155/2018/9356451.

* cited by examiner

FILTRATION SYSTEM FOR GEARED TURBOFAN TANK

TECHNICAL FIELD

This disclosure relates to gearboxes and, in particular, to filtration systems for gearboxes.

BACKGROUND

Present filtration systems suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

In an example, a filtration system is provided including a gearbox positioned in a geared turbofan engine. The gearbox is configured to drive a fan of the geared turbofan engine. The filtration system further includes a primary lubrication system positioned in the geared turbofan engine. The primary lubrication system is in fluid communication with the gearbox. The primary lubrication system is configured to provide a lubricant to the gearbox. The filtration system further includes an auxiliary lubrication system positioned in the geared turbofan engine. The auxiliary lubrication system is in fluid communication with the gearbox. The auxiliary lubrication system is configured to provide the lubricant to the gearbox if the geared turbofan engine is not running during flight. The filtration system further includes a non-removable filter positioned in the auxiliary lubrication system. The non-removable filter is configured to prevent or limit debris that is suspended in the lubricant from flowing into the gearbox.

In another example, a filtration system is provided including a gearbox positioned in a gas turbine engine. The filtration system further includes a lubrication system positioned in the gas turbine engine and is in fluid communication with the gearbox. The lubrication system includes a reservoir, a pump in fluid communication with the reservoir, a return line extending between the gearbox and the reservoir, and a supply line. The return line is configured to transport a lubricant from the gearbox to the reservoir. The supply line extends between the pump and the gearbox. The supply line is configured to transport the lubricant from the pump to the gearbox. The filtration system further includes a non-removable filter positioned in the lubrication system. The non-removable filter is configured to prevent or limit debris that is suspended in the lubricant from flowing into the pump.

In yet another example, a method is provided in which a flow of lubricant is received from a gearbox for a geared turbofan engine. The flow is transported through an auxiliary return line of an auxiliary lubrication system into an auxiliary reservoir of the auxiliary lubrication system. The auxiliary reservoir includes an upstream portion and a downstream portion relative to the flow of the lubricant. The lubricant includes debris. At least a portion of the debris is removed from the lubricant by a non-removable filter. The non-removable filter is positioned in the auxiliary lubrication system. The lubricant, which had at least a portion of the debris removed, is pumped through an auxiliary supply line of the auxiliary lubrication system and into the gearbox.

A geared turbofan engine is a gas turbine engine, which includes a gearbox. The gearbox drives rotation of a fan of the geared turbofan engine. The gearbox includes bearings, which require lubrication with a lubricant, such as oil, to operate the gearbox efficiently. The bearings of the gearbox may be sensitive to no and/or low lubricant situations. As a result, if the bearings do not receive a sufficient amount of lubricant, the fan may not be able to rotate.

The geared turbofan engine includes a primary lubrication system for providing lubricant, such as oil, to the gearbox. The geared turbofan engine may further include an auxiliary lubrication system to provide lubricant to the gearbox during an interruption in the flow of lubricant from the primary lubrication system. An interruption may occur, for example, in a situation, known as windmill, where the geared turbofan engine stops running during flight. For example, the geared turbofan engine may stall while the aircraft is in flight. As a result, power to the primary lubrication system may be cut off, leaving the auxiliary lubrication system to provide lubrication to the gearbox. The auxiliary lubrication system may be configured to provide sufficient lubricant to the gearbox, such that the fan does not stop rotating even during windmill. A non-rotating fan during windmill may result in a significant amount of aerodynamic drag, which may result in an unacceptably low aircraft extended-range twin-engine operational performance standards (ETOPS) rating.

In gas turbine engines that do not include gearboxes, systems such as the primary and auxiliary lubrication systems may include removable filters for the collection of debris. Due to the general layout of the geared turbofan engine, however, the auxiliary lubrication system may be adjacent a central axis of the of the geared turbofan engine, such that the auxiliary lubrication system is effectively buried in the geared turbofan engine. For example, at least one component of the auxiliary lubrication system, such as an auxiliary reservoir, may be coupled to the geared turbofan beneath a blade of the fan. As a result, the auxiliary lubrication system may not be easily accessed for maintenance purposes, such as to replace a debris filter.

One interesting feature of the systems and methods described below may be a non-removable filter in the auxiliary lubrication system, which prevents and/or limits an amount of debris that is reintroduced into the gearbox.

Figure 1:
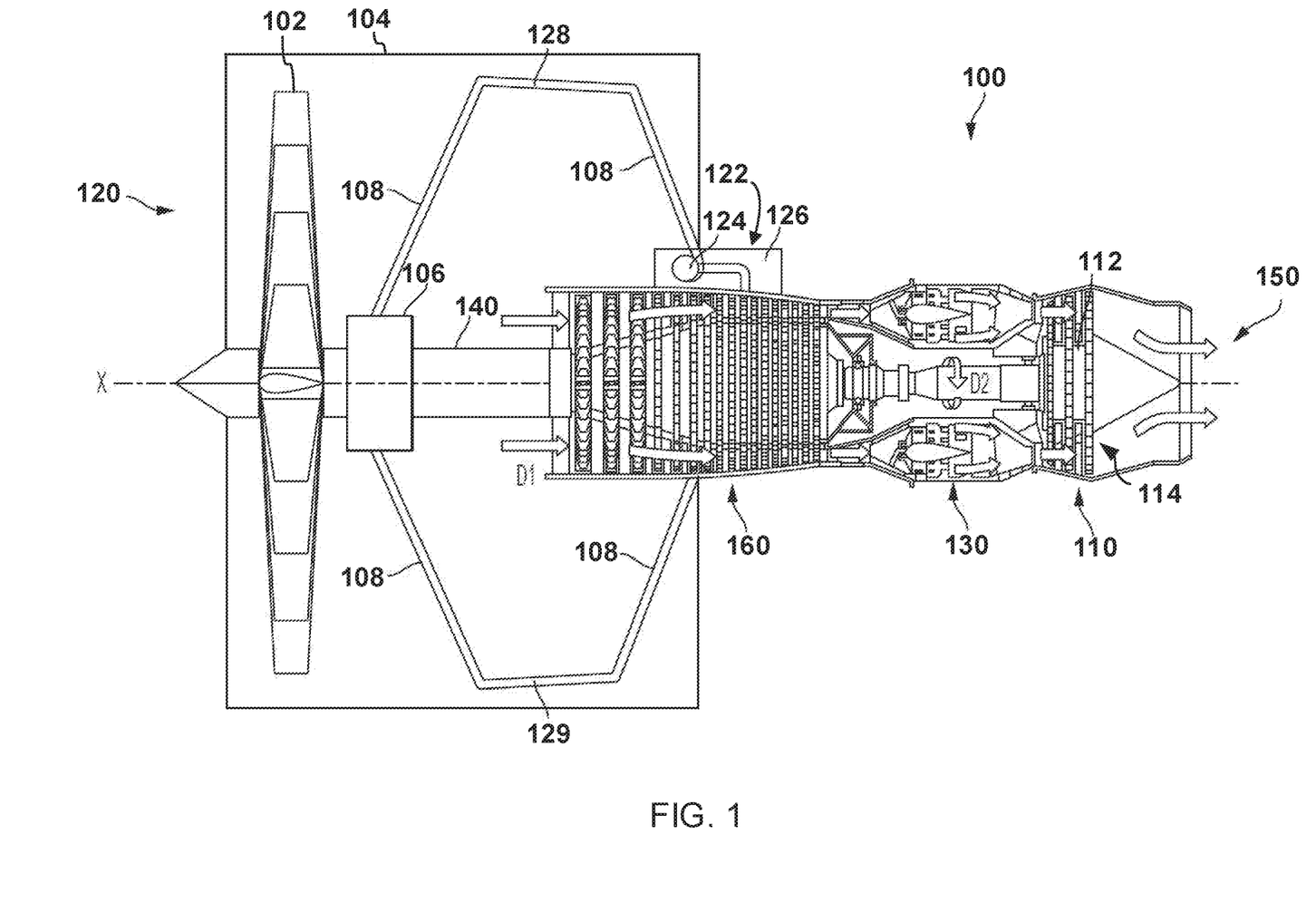
FIG. 1 illustrates a cross-sectional view of an example of a gas turbine engine.

FIG. 1 is a cross-sectional view of a gas turbine engine 100. In some examples, the gas turbine engine 100 may supply power to and/or provide propulsion for an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 100 may take a variety of forms in various examples. Though depicted as an axial flow engine, in some forms the gas turbine engine 100 may have multiple spools and/or may be a centrifugal or mixed centrifugal/axial flow engine. In some forms, the gas turbine engine 100 may be a turbofan, a geared turbofan, or a turboshaft engine. Furthermore, the gas turbine engine 100 may be an adaptive cycle and/or variable cycle engine. Other variations are also contemplated.

The gas turbine engine 100 may include an intake section 120, a compressor section 160, a combustion section 130, a turbine section 110, and an exhaust section 150. During operation of the gas turbine engine 100, fluid received from the intake section 120, such as air, travels along the direction D1 and may be compressed within the compressor section 160. The compressed fluid may then be mixed with fuel and the mixture may be burned in the combustion section 130. The combustion section 130 may include any suitable fuel injection and combustion mechanisms. The hot, high pressure fluid may then pass through the turbine section 110 to extract energy from the fluid and cause a turbine shaft of a turbine 114 in the turbine section 110 to rotate, which in turn drives the compressor section 160. Discharge fluid may exit the exhaust section 150.

As noted above, the hot, high pressure fluid passes through the turbine section 110 during operation of the gas turbine engine 100. As the fluid flows through the turbine section 110, the fluid passes between adjacent blades 112 of the turbine 114 causing the turbine 114 to rotate. The rotating turbine 114 may turn a shaft 140 in a rotational direction D2, for example. The blades 112 may rotate around an axis of rotation, which may correspond to a centerline X of the turbine 114 in some examples.

The gas turbine engine 100 may also include a fan 102 positioned upstream from the compressor section 160. The fan 102 may receive fluid from the intake section 120 and direct it downstream. A portion of the fluid passing through the fan 102 may enter the compressor section 160 while another portion of the fluid may bypass the compressor section 160. To better direct fluid passing through the fan 102, the fan 102 may be surrounded by a shroud 104. The shroud 104 may be component which encircles the fan 102. Examples of the shroud 104 may include a duct or a cylindrical shell. The shroud 104 may extend over other portions of the gas turbine engine 100, such as the compressor section 160.

The fan 102 may be coupled to the shaft 140 through a gearbox 106. The gearbox 106 may be any component which mechanically transforms rotations D2 of the shaft 140, which may be driven by the turbine 114, into rotations of the fan 102. Examples of the gearbox 106 may include a coaxial helical inline gearbox, a bevel helical gearbox, or a planetary gearbox (also known as an epicyclic gear train). The fan 102, the shroud 104, and the gearbox 106, may be supported by struts 108 coupled to different points of the gas turbine engine 100. For example, as illustrated in FIG. 1, the struts 108 may extend between the gearbox 106 and the shroud 104, and between the shroud 104 and the compressor section 160. The struts 108 may extend between other portions of the gas turbine engine 100 as well. In other examples, the gearbox 106 may be an accessory gearbox, a step aside gearbox, a bearing chamber, or a sump on any gas turbine engine 100.

In FIG. 1, the gearbox 106 is lubricated by a primary lubrication system 122, which includes a primary pump 124, a primary reservoir 126, a primary supply line 128, and a primary return line 129. The primary lubrication system 122 may be any system that circulates a lubricant, such as oil, through the gearbox 106.

The primary pump 124 and the primary reservoir 126 may be coupled to a portion of the gas turbine engine 100. The primary reservoir 126 may be any vessel capable of retaining a fluid lubricant, such as a cavity, a tube, or a shell. The primary reservoir 126 may be coupled to any portion of the gas turbine engine 100, such as the shroud 104, the compressor section 160, or the combustion section 130. The lubricant may be any fluid, such as oil, capable of reducing frictional interaction between mechanical components, such as gears and bearings. The lubricant may also be any fluid which cools the mechanical components. The primary pump 124 may draw lubricant from the primary reservoir 126 to deliver lubricant to the gearbox 106. Examples of the primary pump 124 may include a fixed displacement pump or a variable displacement pump, such as a rotary vane pump, a piston pump, or a centrifugal pump.

The primary pump 124 may deliver lubricant to the gearbox 106 through the primary supply line 128. The primary supply line 128 may be any structure configured to transport lubricant, such as a tube, a pipe, or a vessel. The primary pump 124 may be powered by the shaft 140 of the gas turbine engine 100. Lubricant may return to the primary pump 124 from the gearbox 106 through a primary return line 129. The primary return line 129 may be any structure configured to transport lubricant, such as a tube, a pipe, or a vessel. Both the primary return line 129 and the primary supply line 128 may pass through the struts 108 in order for the primary reservoir 126 to be in fluid communication with the gearbox 106.

Figure 2:
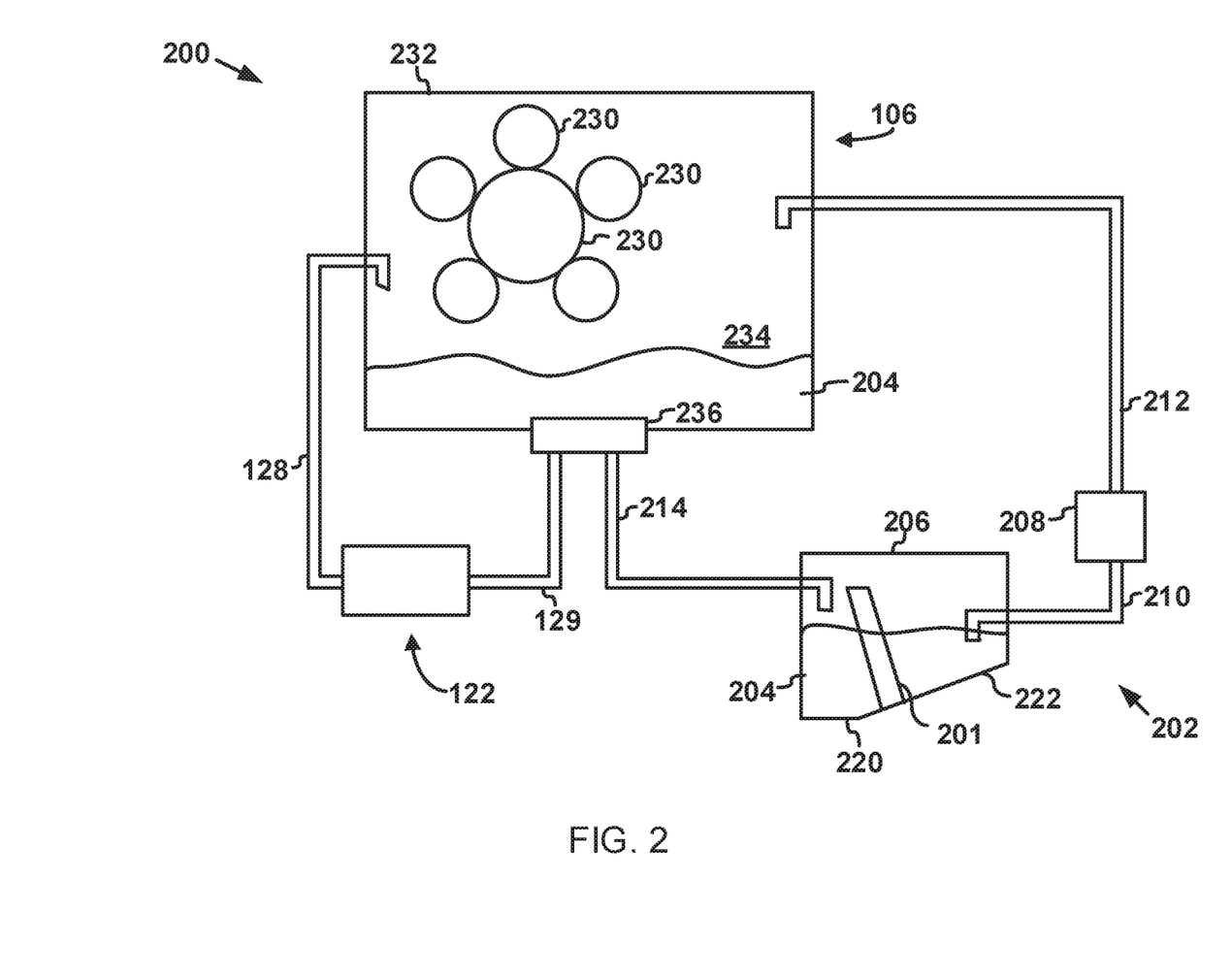
FIG. 2 schematically illustrates an example of a filtration system for a gas turbine engine.

FIG. 2 illustrates a schematic example of a filtration system 200 for a geared turbofan engine. The filtration system 200 may be any system configured to prevent and/or limit debris, for example sand, dirt, and/or metallic particulate, from entering and/or re-entering the gearbox 106. As shown in FIG. 2, the filtration system 200 may include the gearbox 106, the primary lubrication system 122, an auxiliary lubrication system 202, and a non-removable filter 201 positioned in the auxiliary lubrication system 202.

The auxiliary lubrication system 202 may be any system configured to provide lubricant 204, such as oil, to the gearbox 106. The auxiliary lubrication system 202 may include an auxiliary reservoir 206, an auxiliary pump 208, an auxiliary pump supply line 210, an auxiliary supply line 212, and an auxiliary return line 214.

The auxiliary reservoir 206 may be any vessel capable of retaining the lubricant 204, such as a tank, a cavity, a tube, or a shell. The auxiliary reservoir 206 may include an upstream portion 220 and a downstream portion 222. The upstream portion 220 is a portion of the auxiliary reservoir 206 that is upstream of the non-removable filter 201 relative to a flow of the lubricant 204 through the auxiliary lubrication system 202. The downstream portion 222 is a portion of the auxiliary reservoir 206 that is downstream of the non-removable filter 201 relative to the flow of lubricant 204 through the auxiliary lubrication system 202. In an example, as shown in FIG. 2, the auxiliary reservoir 206 is shaped such that the upstream portion 220 is deeper than the downstream portion 222. As a result of the depth change, any debris in the lubricant 204 entering the auxiliary reservoir 206 may be urged by gravity into the upstream portion 220 at the bottom of the auxiliary reservoir 206.

The auxiliary pump 208 may be any pump configured to draw the lubricant 204 from the auxiliary reservoir 206 to deliver the lubricant 204 to the gearbox 106. Examples of the auxiliary pump 208 may include a fixed displacement pump or a variable displacement pump, such as a rotary vane pump, a piston pump, or a centrifugal pump. In some examples, the auxiliary pump 208 may be powered by the shaft 140 of the gas turbine engine 100. In other examples, the auxiliary pump 208 may be powered by a geartrain that is independent from the gearbox 106.

The auxiliary pump supply line 210, the auxiliary supply line 212, and the auxiliary return line 214 may be any structures configured to transport lubricant, such as a tube, a pipe, or a vessel. The auxiliary pump 208 may be configured to pull the lubricant 204 from the auxiliary reservoir 206 through the auxiliary pump supply line 210. The auxiliary pump 208 may be configured to transport the lubricant 204 to the gearbox 106 through the auxiliary supply line 212. The lubricant 204 may return to the auxiliary reservoir 206 from the gearbox 106 through auxiliary return line 214.

As previously described herein, the gearbox 106 may be any component which mechanically transforms rotations of the shaft 140 into rotations of the fan 102. In an example, as shown in FIG. 2, the gearbox 106 may be a planetary gearbox in which multiple gears 230 of the gearbox 106 are positioned in a planetary arrangement. The gears 230 may be any object which is capable of mechanically transferring rotation of one component, such as the shaft 140, to another component, such as the fan 102. Examples of the gears 230 may include spur gears, helical gears, or herringbone gears forming a planetary gear train.

The gearbox 106 may also include a casing 232 which surrounds the gears 230. The casing 232 may be any object which encloses the gears 230. The casing 232 may have an interior which defines a sump 234. The sump 234 may be any portion of the gearbox 106 within the casing 232 which is spaced apart from and directly beneath the gears 230, such that any lubricant 204 passing through the gears 230 would gravitationally descend into the sump 234. Examples of the sump 234 may include a volume, a hold, or a pocket.

The gearbox 106 may further include a splitter 236 in fluid communication with the sump 234 of the gearbox 106, the primary return line 129, and the auxiliary return line 214. The splitter 236 may be any device that is configured to partition an amount of the lubricant 204 that is transported to each of the primary lubrication system 122 and the auxiliary lubrication system 202 from the sump 234 of the gearbox 106. In an example, the splitter 236 may be configured to preferentially fill the auxiliary reservoir 206 before filling the primary reservoir 126. Alternatively or in addition the primary pump 124 and the auxiliary pump 208 may be configured to pump the lubricant 204, such that a flow rate of lubricant through the auxiliary lubrication system 202 is less than a flow rate of the lubricant 204 through the primary lubrication system 122. For example, the flow rate of the auxiliary lubrication system 202 may be between 8-12 L/min and the flow rate of the primary lubrication system 122 may be greater than 12 L/min. As result, a smaller volume of lubricant is recirculated through the auxiliary lubrication system 202 and thus passes through the non-removable filter 201.

As noted above, the filtration system 200 includes the non-removable filter 201. The non-removable filter 201 may be positioned and/or included in the auxiliary lubrication system 202. The non-removable filter 201 may be any structure, feature, or subcomponent configured to prevent and/or limit the passage of debris, such as dirt, sand, dust, and/or metallic particulate, into the auxiliary pump 208 and the gearbox 106. Unlike a removable filter, for example an oil filter for an oil tank in a non-geared gas turbine engine, the non-removable filter 201 described herein may be permanently fixed to the auxiliary lubrication system 202. As a result, the non-removable filter 201 may not be removed from the gas turbine engine 100 (which is a geared turbofan engine) unless a portion and/or component of the auxiliary lubrication system 202 that the non-removable filter 201 is permanently attached and/or fixed to is removed from the gas turbine engine 100. Alternatively or in addition, the non-removable filter 201 may be considered non-removable, because removal of the non-removable filter 201 is more difficult than removal of filters from traditional gas turbine engines that are not geared turbofan engines, which may be removed during routine maintenance.

Depending on the configuration of the non-removable filter 201, the non-removable filter 201 may be positioned in different areas of the auxiliary lubrication system, such as, for example, in the auxiliary return line 214 and/or the auxiliary reservoir 206. The non-removable filter may be configured to actively or passively remove debris from the lubricant. For example, the shape of the non-removable filter may passively promote debris removal, such in the case of a baffle. Additionally, the non-removable filter may include mechanical components that actively remove debris, for example when the non-removable filter is a cyclonic and/or ultrasonic separator. Examples of the non-removable filter 201 may include but are not limited to a baffle, a magnet, a turbulator, a projection, and/or a cyclonic separators. Examples of the non-removable filter will be described in more detail herein with reference to FIGS. 3-5.

During operation, the lubricant 204 carrying debris is provided to the gearbox 106 by the primary lubrication system 122. Lubricant from the gearbox accumulates in the sump 234. The splitter 236 preferentially fills the auxiliary reservoir 206 with the lubricant from the sump 234. As the lubricant is pumped from the auxiliary reservoir 206, the lubricant 204 passes through the non-removable filter 201 which removes at least a portion of the debris from the lubricant. The filtered lubricant is returned to the gearbox 106.

Figure 3:
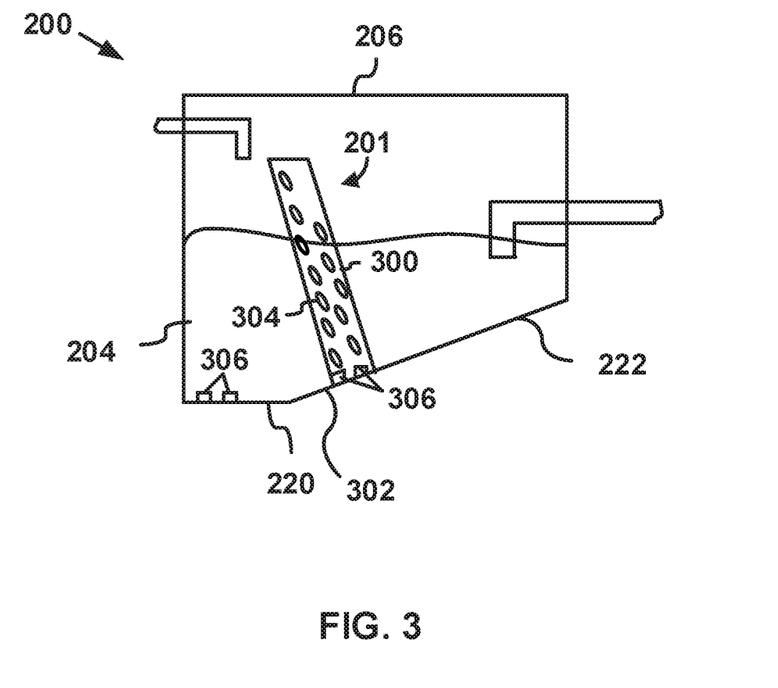
FIG. 3 schematically illustrates an example of a filtration system for a gas turbine engine.

FIG. 3 schematically illustrates an example of the filtration system 200 in which the non-removable filter is a baffle 300 or series of baffles positioned in the auxiliary reservoir 206. The baffle 300 may be any structure configured to restrain or regulate the passage of debris. In an example, as shown in FIG. 3 the baffle 300 may extend upwardly from a bottom 302 of the auxiliary reservoir. In some examples, the baffle 300 extends along only a portion of the height of the auxiliary reservoir 206. In other examples, the baffle 300 may extend between the bottom 302 of the auxiliary reservoir 206 and a top of the auxiliary reservoir 206. In an example, the baffle 300 includes a series of pores 304 extending through the baffle 300. In an example, the baffle 300 may be a fine mesh or screen with the pores 304 being the space between the bars or wires of the mesh. The pores 304 may be any passageway sized to allow the passage of the lubricant. The pores 304 may be smaller than individual particles of debris in the lubricant, such that, as the lubricant is pulled by the auxiliary pump 208 from the upstream portion 220 to the downstream portion 222 of the auxiliary reservoir 206, the particles suspended in the lubricant may be prevented from passing through the pores 304 of the baffle 300 and into the upstream portion 220.

Alternatively or in addition, the non-removable filter 201 may include magnets 306. The magnets 306 may be any metallic structure, for example iron, an alloy, or an ore, configured to attract other metal-containing objects. As shown in FIG. 3, the magnets 306 may be embedded in the baffle 300 and/or positioned at the bottom 302 of the auxiliary reservoir 206. The magnets 306 attract and remove metallic particle particulate, such as ferrous particles, from the lubricant 204. In some examples the non-removable filter 201 includes both the baffle 300 and the magnets 306. In other examples, the non-removable filter 201 may include only the baffle 300 or only the magnets 306.

Figure 4:
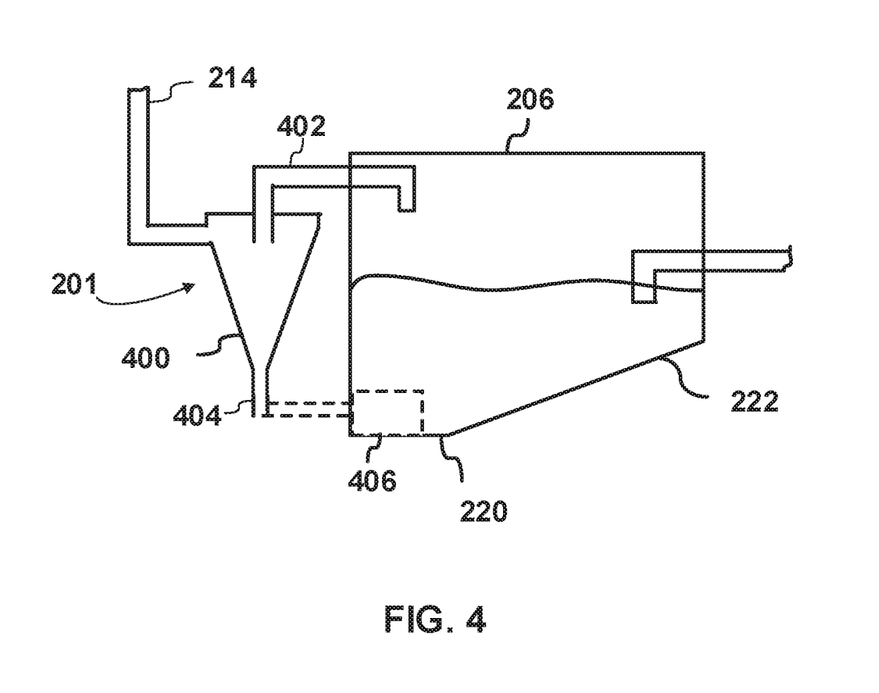
FIG. 4 schematically illustrates an example of a filtration system for a gas turbine engine.
Figure 7:
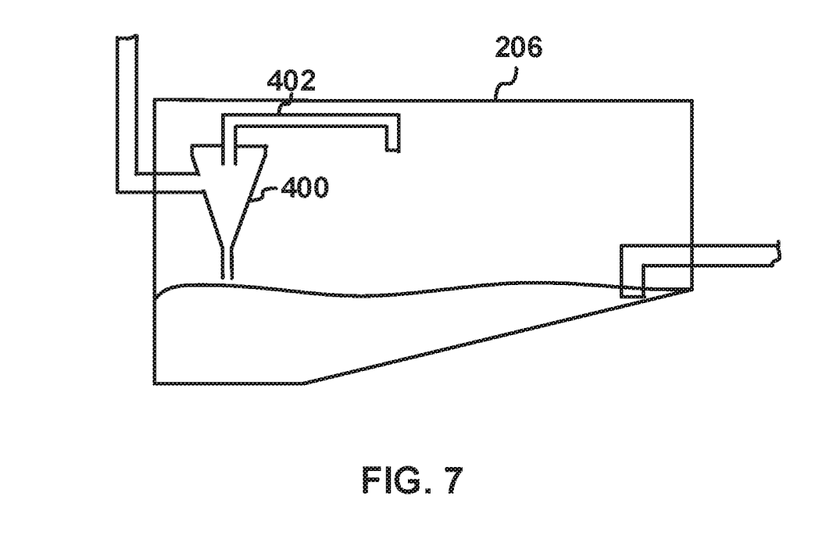
FIG. 7 schematically illustrates an example of a filtration system in which a cyclonic separator is positioned in an auxiliary reservoir.
Figure 8:
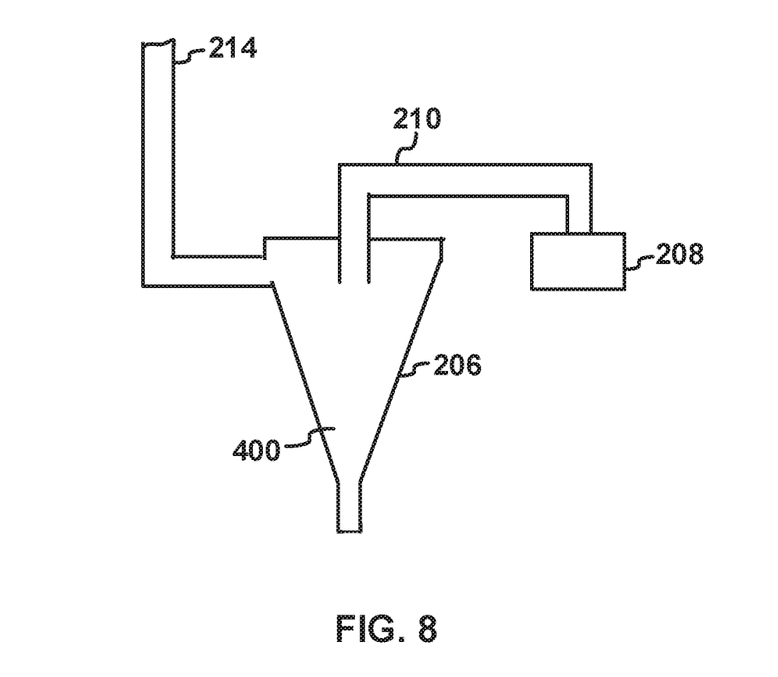
FIG. 8 schematically illustrates an example of a filtration system in which a cyclonic separator is an auxiliary reservoir.

FIG. 4 schematically illustrates an example of the filtration system 200 in which the non-removable filter is a cyclonic separator 400 positioned in the auxiliary return line 214. FIG. 7 schematically illustrates an example of the filtration system 200 in which the cyclonic separator 400 is positioned in the auxiliary reservoir. FIG. 8 schematically illustrates an example of the filtration system 200 in which the auxiliary reservoir 206 is a cyclonic separator. The cyclonic separator 400 may be any device configured to remove particles of debris in the lubricant by centrifugal force. The cyclonic separator 400 includes a filtered lubricant exit line 402 and a particulate exit line 404. The filtered lubricant exit line 402 extends from the top of the cyclonic separator 400 and into the auxiliary reservoir. The particulate exit line 404 is configured to transport debris particulate out of the auxiliary lubrication system 202 and/or into a particulate storage container positioned within or coupled to the auxiliary reservoir 206.

In another example, the non-removable filter 201 shown schematically in FIG. 4 may represent a traditional filter, filter bowl, and filter housing. In this example, the auxiliary lubrication system 202 may be configured to bypass the non-removable filter when the non-removable filter 201 has collected a predetermined amount of particulate. While the traditional filter may be considered removable in other applications, in this example, the traditional filter would be inaccessible due to the traditional filter's position near the central axis of the gas turbine engine 100 and thus may be referred to as non-removable. In this example, the auxiliary lubrication system 202 may include a feedback system which may provide an alert when the non-removable filter collects a predetermined amount of particulate. For example, when the non-removable filter 201 is full. The bypass may include a valve, which allows lubricant to flow into the non-removable filter 201 in a first position and which allows lubricant to bypass the non-removable filter 201 and flow into the auxiliary reservoir 206 in a second position.

During operation, lubricant enters the cyclonic separator 400 through the auxiliary return line 214. The lubricant 204 spins in a vortex/helical pattern inside the cyclonic separator 400. As the lubricant 204 spins, particulate falls out of the lubricant 204 and into the particulate exit line 404. The remaining filtered lubricant is then transported to the auxiliary reservoir via the filtered lubricant exit line 402. The cyclonic separator may be further configured to remove air from the lubricant, which may improve the quality of the lubricant that is returned to the gearbox 106.

Figure 5:
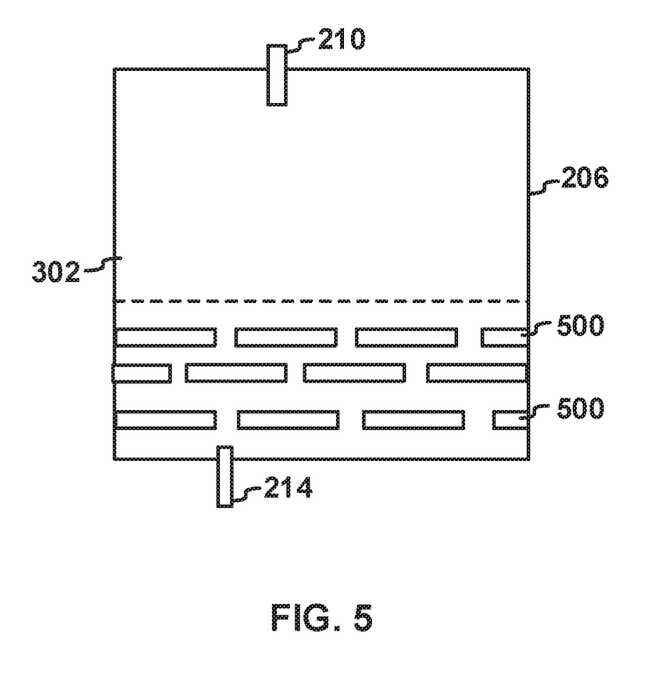
FIG. 5 schematically illustrates an example of a filtration system for a gas turbine engine.

FIG. 5 schematically illustrates an example of the filtration system 200 in which the non-removable filter 201 includes turbulators 500 positioned extending from the bottom 302 of the auxiliary reservoir 206. FIG. 5 is a top view of the bottom 302 of the auxiliary reservoir 206. The turbulators 500 may be any projections extending from the bottom 302 of the auxiliary reservoir 206 that are configured to impede a flow path of the lubricant 204 and may trap debris within the turbulators 500, as the lubricant 204 flows from the auxiliary return line 214 to the auxiliary pump supply line 210.

Figure 6:
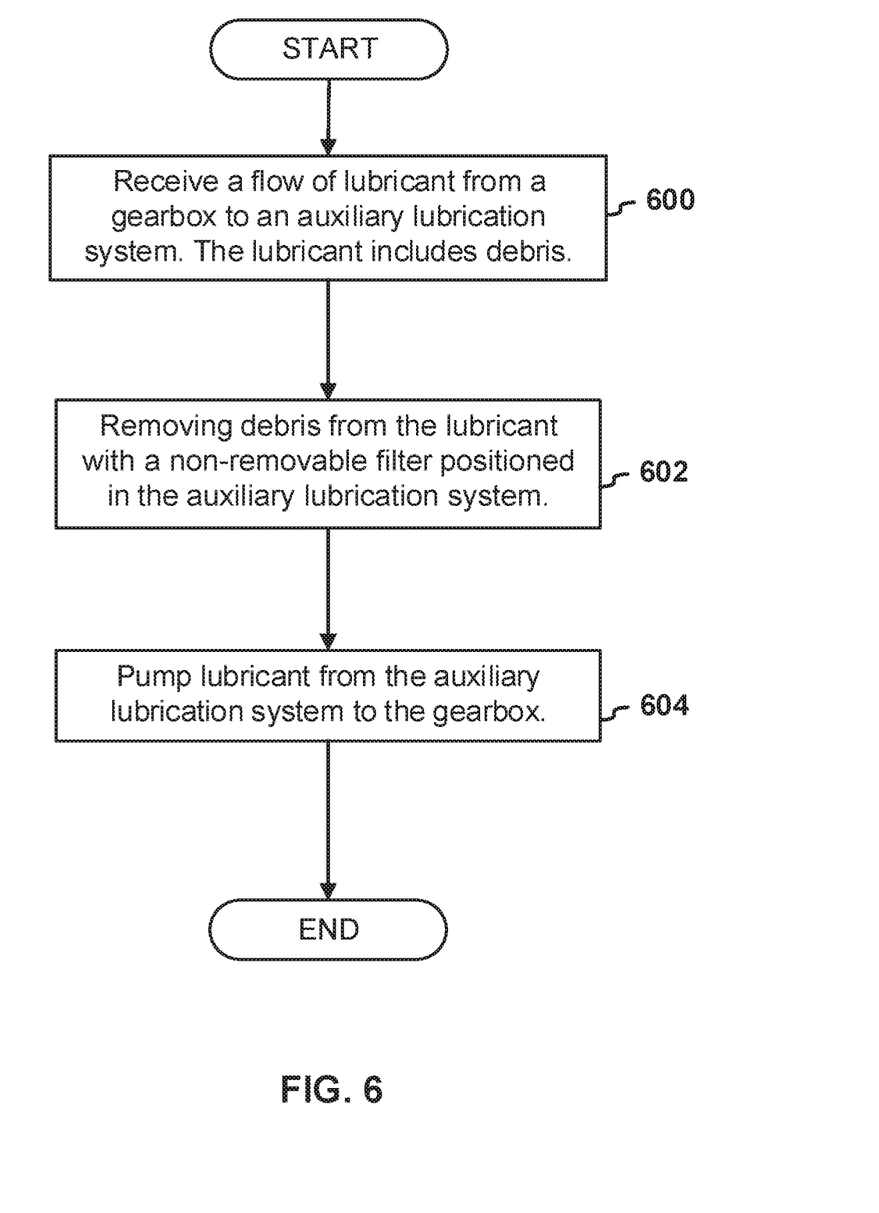
FIG. 6 illustrates a flow diagram of an example of a method of filtration for a gas turbine engine.

FIG. 6 illustrates a flow diagram of an example of steps to remove debris from the lubricant 204. A flow of the lubricant is received from the gearbox 106 through the auxiliary return line 214 and into the auxiliary reservoir 206 (600). The auxiliary reservoir 206 has an upstream portion 220 and a downstream portion 222 relative to the flow of the lubricant 204. The lubricant 204 contains debris therein. At least a portion of the debris is removed from the lubricant by a non-removable filter 201 (602). The non-removable filter 201 is positioned in the auxiliary reservoir 206. The lubricant 204 which has had at least a portion of the debris removed is pumped through an auxiliary supply line and into the gearbox (604). The steps may include additional, different, or fewer operations than illustrated in FIG. 6. For example, the gearbox 106 may include a splitter 236. The gearbox 106 may further receive the lubricant from the primary lubrication system 122, which includes the primary pump 124 and the primary reservoir 126. The splitter 236 may be configured to preferentially fill the auxiliary reservoir 206 before filling the primary reservoir 126. Furthermore the non-removable filter may be positioned in the auxiliary return line 214 instead of the auxiliary reservoir 206. The steps may be executed in a different order than illustrated in FIG. 6.

Each component may include additional, different, or fewer components. For example the auxiliary reservoir 206 may include a collection pan and/or tank for receiving debris that is filtered out of the lubricant 204. The filtration system may further include an ultrasonic device, which is configured to produce ultrasonic waves through the lubricant 204 to remove suspended particles from the lubricant 204. The turbulators 500 may be positioned to define a labyrinth flow path for the lubricant 204. In another examples, the non-removable filter may include multiple non-removable filters. For example, the auxiliary reservoir may include multiple baffles. In another example, the baffle 300, the magnet(s) 326, the cyclonic separator 400, the turbulators 500, or combinations thereof may be positioned in the auxiliary lubrication system 202, for example, in the auxiliary return line 214 and/or the auxiliary reservoir 206.

The filtration system 200 may be implemented with additional, different, or fewer components. For example, the filtration system 200 may only include the non-removable filter 201 and the auxiliary lubrication system 202.

Furthermore, though the filtration system 200 is described with reference to the auxiliary lubrication system 202 herein, all of the features discussed herein may be incorporated in the primary lubrication system 122 of the gas turbine engine 100 to minimize and/or eliminate routine aircraft maintenance. Even in examples where routine aircraft maintenance is not minimized, the size of the filter assembly in the primary system may be reduced, if features of the filtration system 200 described herein were included in the primary lubrication system 122.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a filtration system comprising: a gearbox positioned in a geared turbofan engine, the gearbox configured to drive a fan of the geared turbofan engine; a primary lubrication system positioned in the geared turbofan engine and in fluid communication with the gearbox, the primary lubrication system configured to provide a lubricant to the gearbox; an auxiliary lubrication system positioned in the geared turbofan engine and in fluid communication with the gearbox, the auxiliary lubrication system configured to provide the lubricant to the gearbox if the geared turbofan engine is not running during flight; and a non-removable filter positioned in the auxiliary lubrication system configured to prevent or limit debris that is suspended in the lubricant from flowing into the gearbox.

A second aspect relates to the system of aspect 1, wherein the non-removable filter includes a baffle.

A third aspect relates to the system of any preceding aspect, wherein the baffle includes a plurality of pores extending through the baffle, wherein the pores are smaller than at least a portion of the debris.

A fourth aspect relates to the system of any preceding aspect, wherein the baffle comprises a magnet embedded in the baffle.

A fifth aspect relates to the system of any preceding aspect, wherein the non-removable filter is located in an auxiliary reservoir of the auxiliary lubrication system.

A sixth aspect relates to the system of any preceding aspect, wherein the non-removable filter includes a cyclonic separator.

A seventh aspect relates to the system of any preceding aspect, wherein the gearbox includes a planetary gearbox.

An eighth aspect relates to a filtration system comprising: a gearbox positioned in a gas turbine engine; a lubrication system positioned in the gas turbine engine and in fluid communication with the gearbox, the lubrication system comprising a reservoir, a pump in fluid communication with the reservoir, a return line extending between the gearbox and the reservoir, the return line configured to transport a lubricant from the gearbox to the reservoir, and a supply line extending between the pump and the gearbox, the supply line configured to transport the lubricant from the pump to the gearbox; and a non-removable filter positioned in the lubrication system, the non-removable filter is configured to prevent or limit debris that is suspended in the lubricant from flowing into the pump.

A ninth aspect relates to the system of any preceding aspect, wherein the non-removable filter includes a baffle positioned at a bottom of the reservoir, wherein the baffle includes a plurality of pores extending through the baffle, wherein the baffle is positioned in the reservoir, wherein the pores are smaller than at least a portion of the debris, such that the at least the portion of the debris cannot pass through the pores.

A tenth aspect relates to the system of any preceding aspect, wherein the non-removable filter includes a means for filtering.

An eleventh aspect relates to the system of any preceding aspect, wherein the non-removable filter is configured to actively remove the debris from the lubricant.

A twelfth aspect relates to the system of any preceding aspect, wherein the non-removable filter includes a cyclonic separator positioned in the return line.

A thirteenth aspect relates to the system of any preceding aspect, wherein the non-removable filter is a plurality of turbulators positioned on a bottom of the reservoir, the turbulators configured to impede a flow of the lubricant.

A fourteenth aspect relates to the system of any preceding aspect, wherein the reservoir is shaped to include an upstream portion and a downstream portion, wherein the upstream portion is deeper than the downstream portion, wherein a gravitational force causes the debris to settle at a bottom of the reservoir in the upstream portion, and the gravitational force prevents or limits at least a portion of the debris from entering the downstream portion.

A fifteenth aspect relates to the system of any preceding aspect, wherein the lubrication system is an auxiliary lubrication system, wherein the filtration system further comprises a primary lubrication system positioned in the gas turbine engine and in fluid communication with the gearbox, the primary lubrication system comprising a primary reservoir, a primary return line, the primary return line configured to transport the lubricant from the gearbox to the primary reservoir, and a primary supply line, the primary supply line configured to transport the lubricant to the gearbox.

A sixteenth aspect relates to the system of any preceding aspect, wherein the auxiliary lubrication system further includes a traditional filter, a filter bowl, and a filter housing, and wherein the auxiliary lubrication system is configured to bypass the non-removable filter when the non-removable filter is full.

A seventeenth aspect relates to the system of any preceding aspect, wherein the non-removable filter includes a magnet embedded in a bottom of the reservoir.

An eighteenth aspect relates to the system of any preceding aspect, wherein the lubricant is oil.

A nineteenth aspect relates to a method comprising: receiving a flow of a lubricant from a gearbox for a geared turbofan engine through an auxiliary return line of an auxiliary lubrication system into an auxiliary reservoir of the auxiliary lubrication system, the auxiliary reservoir having an upstream portion and a downstream portion relative to the flow of the lubricant, the lubricant containing debris; removing at least a portion of the debris from the lubricant with a non-removable filter, the non-removable filter positioned in the auxiliary lubrication system; and pumping the lubricant, which has at least a portion of the debris removed, through an auxiliary supply line of the auxiliary lubrication system and into the gearbox.

A twentieth aspect relates to the system of any preceding aspect, wherein the non-removable filter includes a baffle positioned in the auxiliary reservoir between the upstream portion and the downstream portion, wherein the baffle includes a plurality of pores, wherein the pores are sized to limit or prevent debris from entering the downstream portion.

In addition to the features mentioned in each of the independent aspects enumerated above, some examples may show, alone or in combination, the optional features mentioned in the dependent aspects and/or as disclosed in the description above and shown in the figures.

What is claimed is:

1. A filtration system comprising:
   a gearbox positioned in a geared turbofan engine, the gearbox configured to drive a fan of the geared turbofan engine;
   a primary lubrication system positioned in the geared turbofan engine and in fluid communication with the gearbox, the primary lubrication system configured to provide a lubricant to the gearbox;
   an auxiliary lubrication system positioned in the geared turbofan engine and in fluid communication with the gearbox, the auxiliary lubrication system configured to provide the lubricant to the gearbox if the geared turbofan engine is not running during flight, the auxiliary lubrication system comprising an auxiliary reservoir configured to retain the lubricant,
   wherein the auxiliary reservoir comprises:
      a first side having an inlet;
      a second side opposite the first side and having an outlet;
      a bottom comprising a deepest portion and a sloped portion, the sloped portion configured to cause a gravitational force to urge debris suspended in the lubricant toward the deepest portion; and
      a filter positioned in the auxiliary reservoir, the filter configured to prevent or limit the debris that is suspended in the lubricant from flowing into the gearbox, wherein the filter is a planar baffle fixedly attached to and projecting from the sloped portion of the bottom of the auxiliary reservoir, the planar baffle comprising:
         a plurality of pores extending through the planar baffle, the plurality of pores being smaller than at least a portion of the debris to prevent the at least the portion of the debris from passing through the planar baffle; and
         a magnet embedded in the planar baffle projecting from the sloped portion of the bottom of the auxiliary reservoir.

2. The filtration system of claim 1, wherein the gearbox includes a planetary gearbox.

3. The filtration system of claim 1, wherein the auxiliary lubrication system further comprises a pump in fluid communication with the auxiliary reservoir, a return line extending between the gearbox and the auxiliary reservoir, the return line configured to transport a lubricant from the gearbox to the auxiliary reservoir, and a supply line extending between the pump and the gearbox, the supply line configured to transport the lubricant from the pump to the gearbox.

4. The filtration system of claim 1, wherein the primary lubrication system comprises a primary reservoir, a primary return line, the primary return line configured to transport the lubricant from the gearbox to the primary reservoir, and a primary supply line configured to transport the lubricant to the gearbox.

5. The filtration system of claim 1, wherein the magnet comprises a first magnet, and wherein the filter further includes a second magnet embedded in the bottom of the auxiliary reservoir.

6. The filtration system of claim 1, wherein the lubricant is oil.

* * * * *